J. H. PEARCE.
ELECTRIC MOTOR.
APPLICATION FILED NOV. 17, 1909.

995,632.

Patented June 20, 1911.

Witnesses:
N. P. Leonard,
C. H. Potter.

Inventor:
John H. Pearce
by Byrnes Townsend & Brickenstein
Att'ys.

UNITED STATES PATENT OFFICE.

JOHN H. PEARCE, OF HELENA, MONTANA.

ELECTRIC MOTOR.

995,632.

Specification of Letters Patent. Patented June 20, 1911.

Application filed November 17, 1909. Serial No. 528,489.

*To all whom it may concern:*

Be it known that I, JOHN H. PEARCE, a citizen of the United States, residing at Helena, in the county of Lewis and Clarke and State of Montana, have invented certain new and useful Improvements in Electric Motors, of which the following is a specification.

My invention relates to alternating current electric motors, and the object of the invention is to provide a motor capable of operation by a single-phase current, but having the high starting torque characteristic of multiphase motors.

Figure 1:
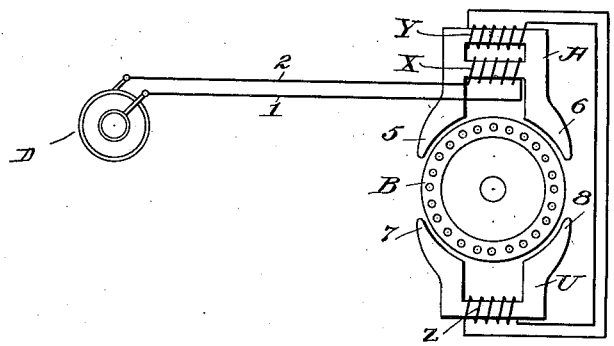
Figure 2:
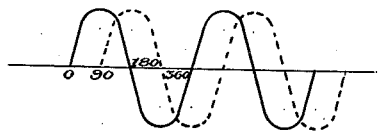
Figure 3:
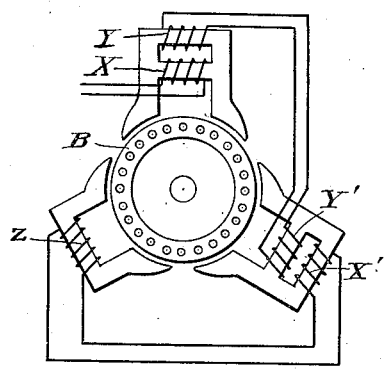

In the drawings,—Figure 1 is a diagrammatic illustration of one form of motor; Fig. 2 is a diagram illustrating the displacement of phase; and Fig. 3 is a diagrammatic illustration of a modified form of motor.

Referring to the drawings D is an alternating current generator for producing single-phase currents, connected by mains 1, 2, to a motor in which B is an armature of the usual squirrel-cage induction type. One of the field poles A is an A-shaped structure of laminated iron having wound about the cross-bar a coil X, included in the single-phase alternating current circuit. Wound about the upper bar of the A-shaped field pole is a coil Y which is part of a closed circuit including also a coil wound about the lower portion of the U-shaped lower field pole. Upon the passage of current through the primary coil X a magnetic field will be produced in the pole, part of the magnetic flux flowing through the outwardly extending pole pieces 5, 6, and part through the upper bar of the A pole, and inducing a current in the secondary coil and the closed circuit including this coil and the coil Z. The U-shaped field-pole will thereby be magnetized, the magnetic flux flowing through the outwardly extending pole pieces 7, 8, the thus produced field lagging practically 90° behind that generated in the pole A.

While I have shown in Fig. 1, a motor provided with only two field poles, a larger number may be used. Thus in Fig. 3 is shown an arrangement in which three field poles are used. In this arrangement, the field poles are arranged at angles of 120° to each other, two A-shaped poles and one U-shaped pole being used. The induced current in the coils Y, Y', in turn induces current in the circuit-including coils X', Z, and magnetic field successively lagging one behind the other in time are thus produced in the respective pole-pieces. The A poles thus act not only as field-poles for the motor, but as induction coils or converters for furnishing energizing current to the succeeding field poles.

The arrangement described produces a motor having a rotating field, energized by a single-phase alternating current and having a high-starting torque.

While I have for convenience referred to the poles as A-shaped and U-shaped, it is obvious that they may be made of other shapes and yet embody the principle of my invention.

I claim:—

1. In an alternating current motor having an armature, the combination of a field pole consisting of side portions and connecting cross-bars, a coil around one of said bars adapted to be connected to a source of alternating current, a secondary coil around the second cross-bar, a second field pole, and a coil thereon in closed circuit with the said secondary coil.

2. In an alternating current motor having an armature, the combination of a field magnet core having a coil thereon adapted to be connected to a source of alternating current, a secondary coil on said core adapted to carry current induced by the flux in said core, a second separate field magnet core having a coil thereon in closed electrical connection with said secondary coil, the field magnets having their pole pieces arranged in the same transverse plane of the armature.

3. In an alternating current motor, a field magnet system consisting of a field magnet comprising pole pieces and a continuous iron core, and having thereon a primary coil adapted to be connected to a source of alternating current, a secondary coil on said core, a second field magnet comprising pole pieces and a continuous iron core, and a primary coil on said second magnet in closed electrical connection with the secondary coil on the first magnet.

4. In an alternating current motor, a series of field magnets, one of said magnets comprising pole pieces and a continuous iron core forming a closed magnetic circuit, a primary coil on one portion of said core, a secondary coil on said core, a primary coil on the core of a second similarly constructed field magnet in closed electrical connection with the secondary coil on the first magnet, a secondary coil on the second field magnet core, and a third field magnet having thereon a coil in closed electrical connection with said last-mentioned secondary coil.

In testimony whereof, I affix my signature in presence of two witnesses.

JOHN H. PEARCE.

Witnesses:
 MARCUS M. LYTER,
 HINMAN D. FOLSOM, Jr.